United States Patent
Miyazaki et al.

(10) Patent No.: US 7,653,308 B2
(45) Date of Patent: Jan. 26, 2010

(54) PATH ROUTING COMPUTATION METHOD AND OPTICAL COMMUNICATION NETWORK APPLYING PATH ROUTING COMPUTATION METHOD

(75) Inventors: Keiji Miyazaki, Kawasaki (JP); Yasuki Fujii, Kawasaki (JP); Shinya Kanoh, Kawasaki (JP); Akira Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 444 days.

(21) Appl. No.: 11/504,741

(22) Filed: Aug. 15, 2006

(65) Prior Publication Data
US 2007/0212068 A1 Sep. 13, 2007

(30) Foreign Application Priority Data
Mar. 8, 2006 (JP) ............................. 2006-062010

(51) Int. Cl.
*H04J 14/00* (2006.01)
(52) U.S. Cl. ................... 398/58; 398/57; 398/59
(58) Field of Classification Search ............ 398/2–5, 398/57, 58, 59; 370/351, 400, 404, 405, 370/406
See application file for complete search history.

(56) References Cited

U.S. PATENT DOCUMENTS 7,468,946 B2 * 12/2008 Yucel ..................... 370/235

2001/0017723 A1 * 8/2001 Chang et al. ............. 359/128
2002/0131424 A1 9/2002 Suemura
2003/0016678 A1 1/2003 Maeno
2008/0151916 A1 * 6/2008 Jetcheva et al. ........... 370/401

FOREIGN PATENT DOCUMENTS

JP  2002-271372  9/2002
JP  2003-198609  7/2003

* cited by examiner

*Primary Examiner*—Dalzid Singh
(74) *Attorney, Agent, or Firm*—Katten Muchin Rosenman LLP

(57) ABSTRACT

A path routing computation method enables reduction of the memory capacity for path routing computation. The method is characterized in that a wavelength convertible subnetwork in which paths are connected in a mesh form; a first and second wavelength inconvertible subnetworks have a starting point node and an end point node, respectively, and include a plurality of nodes and connected via the wavelength convertible subnetwork, and out of the nodes constituting the first and second wavelength inconvertible subnetworks, a node has a port connected to the wavelength convertible subnetwork is defined as a border node, and the method includes the steps of: obtaining, for the first wavelength inconvertible subnetwork, a path from the starting point node to a border node in the first subnetwork; and obtaining, for the second wavelength inconvertible subnetwork, a path from the end point node to a border node in the second wavelength inconvertible subnetwork.

9 Claims, 13 Drawing Sheets

STARTING POINT : WAVELENGTH 1

US 7,653,308 B2

PATH ROUTING COMPUTATION METHOD AND OPTICAL COMMUNICATION NETWORK APPLYING PATH ROUTING COMPUTATION METHOD

CROSS-REFERENCE TO RELATED APPLICATIONS

This application is based upon and claims the benefit of priority from the prior Japanese Patent Application No. 2006-62010, filed on Mar. 8, 2006, the entire contents of which are incorporated herein by reference.

BACKGROUND OF THE INVENTION

1. Field of the Invention

The present invention relates to a path routing computation method and an optical communication network applying the path routing computation method. Particularly, the present invention relates to a path routing computation method for setting a path in a network connected to wavelength convertible and inconvertible subnetworks constituted by Reconfigurable Optical Add/Drop Multiplexing (ROADM) devices.

2. Description of the Related Art

Regarding the forms of optical communication networks, there is a ROADM ring network in which ROADM devices present in nodes are connected to form a ring. In the example shown in FIG. 1 a ROADM ring network is constituted such that three ROADM rings 1, 2, and 3 are connected with each other as subnetworks. The inside of each of the ROADM rings is fixed to a transmission wavelength for fixation. Specifically, wavelengths are fixed so that wavelength conversion cannot be performed.

FIG. 2 is a configuration example of a ROADM device having, for example, a ring 1. The inside of the ring 1 is constituted such that a wavelength signal with a wavelength of λ1 through λ10 is transmitted, and that an optical signal having a specific wavelength is added and dropped from or to a tributary portion 13 through a switch 12a, 12b.

Therefore, in FIG. 1, when an optical signal with a wavelength 1 is transmitted from a ROADM device of a node A as a starting point to a ROADM device of a node Z as an end point, the inside the ring 1 is transmitted at the fixed wavelength 1 as it is, and then the wavelength 1 is converted at a node in the ring 3 and transmitted at a wavelength 5 fixed inside the ring 3.

In this manner, the ROADM ring network has a restriction in the transmission wavelengths, and further has a restriction in transmittable wavelengths based on deterioration and the like in transmission of signals in the nodes through which the signals pass.

On the other hand, as other form of an optical communication network, there is a WDM network in which paths are connected in the form of a mesh. This is a wavelength convertible network which does not have a restriction that the transmission wavelengths are fixed as in the ROADM ring network shown in FIG. 1 above (non-blocking).

FIG. 3 shows a network in which wavelength inconvertible ROADM ring networks 101 and 102 as subnetworks are connected to a wavelength convertible WDM network 100 described above.

In the networks shown in FIG. 1 and FIG. 3, a routing path needs to be set up in order to transmit an optical signal from a starting point node to a destination (end point) node.

In order to set up a routing path, a routing protocol is used beforehand so that network information such as limiting conditions is notified between the nodes, and the network information such as the notified limiting conditions and costs (a random criterion which is set by a user in advance, a numeric value based on, for example, the path selection priority, and the like) between the nodes is stored in a routing table provided in a ROADM device of each node.

In a distributed processing system, in a ROADM device of a node as the starting point which receives a path set-up request, path routing computation for obtaining a path MSL where a routable cost is the minimum is carried out on the basis of the information stored in the routing table.

Alternatively, in a centralized data processing system, network information is stored in a network management system (NMS) for centrally controlling the states of the nodes on the network. On the basis of such network information, the NMS, which receives a request via the ROADM device of the starting point node, performs path routing computation.

As a conventional technology related to path routing computation, there is the invention described in Japanese Patent Application Laid-Open No. 2003-198609. An object of the invention described in Japanese Patent Application Laid-Open No. 2003-198609 is to perform routing computation which does not fail by depending on the restriction on the connectivity between cross-connect devices in an optical communication network.

Further, a virtual neighbor link is defined in backbone, and an optical path routing between a starting point and an end point is computed using the information on the virtual neighbor link.

Moreover, the information described in Japanese Patent Application Laid-Open No. 2002-291372 describes a path routing computation system in which is used a boundary node for performing path setting.

Now, suppose that there is a network configuration as shown in FIG. 4. In this network, ROADM rings R1 through R6 are connected to a mesh network 100 in a multi-stage manner. In such a configuration, the mesh network 100 does not have restrictions in wavelengths. On the other hand, the ROADM rings R1 through R3 and R4 through R6 connected to the mesh network 100 are, as described in FIG. 1, have restrictions in wavelengths and the like.

Regarding path routing computation for path setting, for the ring network in which are connected the ROADM rings R1 through R3 on the starting point node A side, which are connected to the mesh network 100, it is only necessary to consider only a starting point wavelength of λ1 from the starting point node A, as in the explanation of FIG. 1.

However, in the plurality of ROADM rings R4 through R6 on the output side of the mesh network 100, a plurality of wavelengths need to be considered. In this case, the output side of the mesh network 100 has paths in usable wavelengths between λ5 through 15 and in usable wavelengths between λ12 through 20, thus a candidate wavelength cannot be specified.

It is necessary to determine which one of the transponders of the ROADM devices is selected and used to obtain a path of the shortest distance or the lowest cost.

In a method for such a purpose, it is necessary to generate a wavelength graph for each wavelength and search for the shortest distance on the basis of the wavelength graph. The wavelength graph is information obtained by using a wavelength fixed for each link, to define a connection between the links. Therefore, a wavelength graph corresponding to each wavelength needs to be created. Furthermore, generally a scale required for searching for a path is considered to be proportional to the square of the number of nodes. Therefore, there is a problem that the memory capacity required for routing computation becomes extremely large if the number of multiplexed wavelengths increases.

SUMMARY OF THE INVENTION

In view of the above points, an object of the present invention is to provide a path routing computation method and an optical communication network system which applies such a method, the path routing computation method being capable of reducing the memory capacity for path routing computation without increasing the size of a path routing computation graph in proportion to the number of multiplexed wavelengths even if the number of multiplexed wavelengths increases, and further capable of reducing the time required in routing computation, even if the number of routing computation times increases.

A first aspect of the present invention for achieving the above object is a path routing computation method in an optical communication network having: a wavelength convertible subnetwork in which paths are connected in the form of a mesh; a first wavelength inconvertible subnetwork having a starting point node; and a second wavelength inconvertible subnetwork having an end point node, the first wavelength inconvertible subnetwork having a starting point node and the second wavelength inconvertible subnetwork having an end point node having a plurality of nodes and being connected via the wavelength convertible subnetwork, wherein, out of the nodes constituting the first and second wavelength inconvertible subnetworks, a node having a port connected to the wavelength convertible subnetwork is defined as a border node, and wherein the method has the steps of: obtaining, for the first wavelength inconvertible subnetwork, a path from the starting point node to a border node in the first subnetwork; and obtaining, for the second wavelength inconvertible subnetwork, a path from the end point node to a border node in the second wavelength inconvertible subnetwork.

The first aspect can be configured such that, when the end point node is searched by the step of obtaining, for the first wavelength inconvertible subnetwork, a path from the starting point node to a border node in the first wavelength inconvertible subnetwork, the routing computation is ended.

The first aspect can be configured such that, if a border node, which is searched by the step of obtaining, for the first wavelength inconvertible subnetwork, a path from the starting point node to a border node in the first wavelength inconvertible subnetwork, does not have a border node which is searched by the step of obtaining, for the second wavelength inconvertible subnetwork, a path from the end point node to a border node in the second wavelength inconvertible subnetwork, routing computation is further performed alternately for the first wavelength inconvertible subnetwork and the second wavelength inconvertible subnetwork until the same border node is searched, with the searched border nodes as original points.

Moreover, in the above description, a path of the lowest cost in a combination of the paths searched for the first wavelength inconvertible subnetwork and the second wavelength inconvertible subnetwork is taken as a shortest-distance path to be obtained.

Furthermore, wherein the shortest path between the starting point node and the end point node is obtained as a predetermined shortest path in advance without considering wavelength limiting conditions, and the obtained shortest path is compared with the predetermined shortest path to determine whether to perform further routing search, on the basis of a predetermined rate with respect to the predetermined shortest path.

Further, a second aspect of the present invention for achieving the above object is an optical communication network system, having: a wavelength convertible subnetwork in which paths are connected in the form of a mesh; a first wavelength inconvertible subnetwork having a starting point node; and a second wavelength inconvertible subnetwork having an end point node, the first and second subnetworks having a plurality of nodes in the form of a ring and transmitting signals at a fixed wavelength, wherein, out of the nodes constituting the first and second wavelength inconvertible subnetworks, a node having a port connected to the wavelength convertible subnetwork is defined as a border node, and a path to a border node in the first wavelength inconvertible subnetwork in the starting point node and a path from the end point node in the second wavelength inconvertible subnetwork to a border node in the second wavelength inconvertible subnetwork are obtained to set a path of the lowest cost, which is obtained in a combination of the paths searched for the first wavelength inconvertible subnetwork and the second wavelength inconvertible subnetwork, as a path from the starting point node to the end point node.

In addition, a third aspect of the present invention for achieving the above object is a node device which is connected to a wavelength convertible network and which constitutes a wavelength inconvertible subnetwork, out of a plurality of node devices each of which notifies address information and link information as topology information in order to search for and set a path from a starting point node to an end point node in a subnetwork having the plurality of node devices, wherein the information to be notified as the topology information includes information indicating that a home node of each of the node devices is a border node.

DESCRIPTION OF THE PREFERRED EMBODIMENTS

According to the present invention, routing computation is performed starting from the starting point and end point nodes to the border nodes, and memory for routing computation can be reduced by merging into one node. Moreover, conventionally a wavelength graph was required to be created using exchanged network information to perform path routing computation, whereby, for a subnetwork without an end point as well, routing computation was performed. However, if the network size was large, routing computation required a long time. In the present invention, on the other hand, a graph for routing computation, which is used in routing computation, can be made small by using border nodes. Accordingly, time required in routing computation can be reduced.

Embodiments of the present invention are described hereinafter with reference to the drawings. It should be noted that the embodiments are explanations of the present invention to understand the present invention, thus the technical scope of the present invention is not to be limited to the embodiments.

Figure 5:
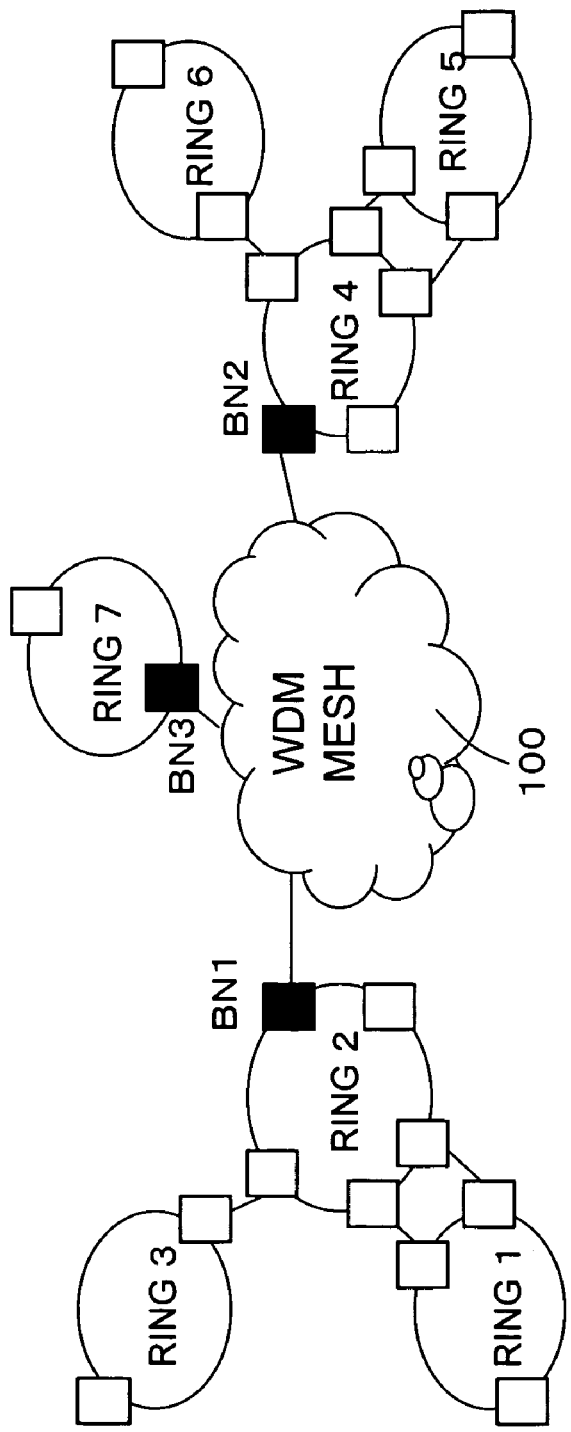
FIG. 5 is a figure showing a configuration example of a network of a first embodiment of the present invention.

FIG. 5 is a figure showing a configuration example of a network of a first embodiment of the present invention. In FIG. 5 a ring (single formation) 2, a ring 4, and a ring 7 as wavelength inconvertible subnetworks are connected to a core network (mesh network) 100 as a wavelength convertible subnetwork by one node device, respectively.

The device connected the core network 100 is defined as a border node. Therefore, the ring 2, ring 4, and ring 7 are connected to the core network 100 by a border node BN1, a border node BN2, and a border node BN3, respectively.

Moreover, the rings are configured in connection with each other by another plurality of node devices. When a signal is inserted in a branched manner in nodes, ROADM devices are disposed as the node devices.

Figure 6:
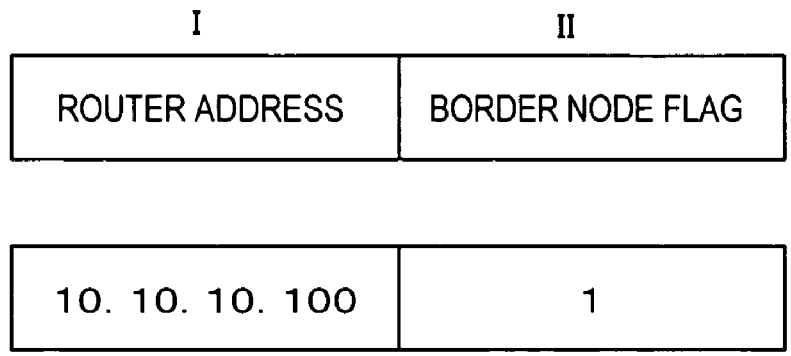
FIG. 6 is a figure for explaining notification of a border node.

When path routing computation is carried out in a decentralized manner, a routing protocol is used so that each node device notifies topology information inside the network. With a general routing protocol (OSPF-TE: Open Shortest Path Fast-Traffic Engineering), router address information and link information are notified, but, as shown in FIG. 6, each node device applies a router address I with a flag II indicating whether the node is a border node or not, and notifies this information as router address information. If the node is a border node, flag II "1" is notified, and if not, "0" is notified. It should be noted that the topology information to be notified may be provided with a new field, and information indicating whether the node is a border node or not may be set in this field. The notified topology information is held in each node device which receives the topology information.

In the example shown in FIG. 6, for example, as the router address information for the border node BN1, the router address is 10.10.10.100, and a flag "1" indicating that the node is a border node is set.

Further, when path routing computation is concentrated on an unshown NMS (network management system) and the like, the device information for each node device is held in the NMS.

The abovementioned link information has a link ID of a client, wavelength information used by the client, and an ID of a link to be connected, and is held as a client link table.

Figure 7:
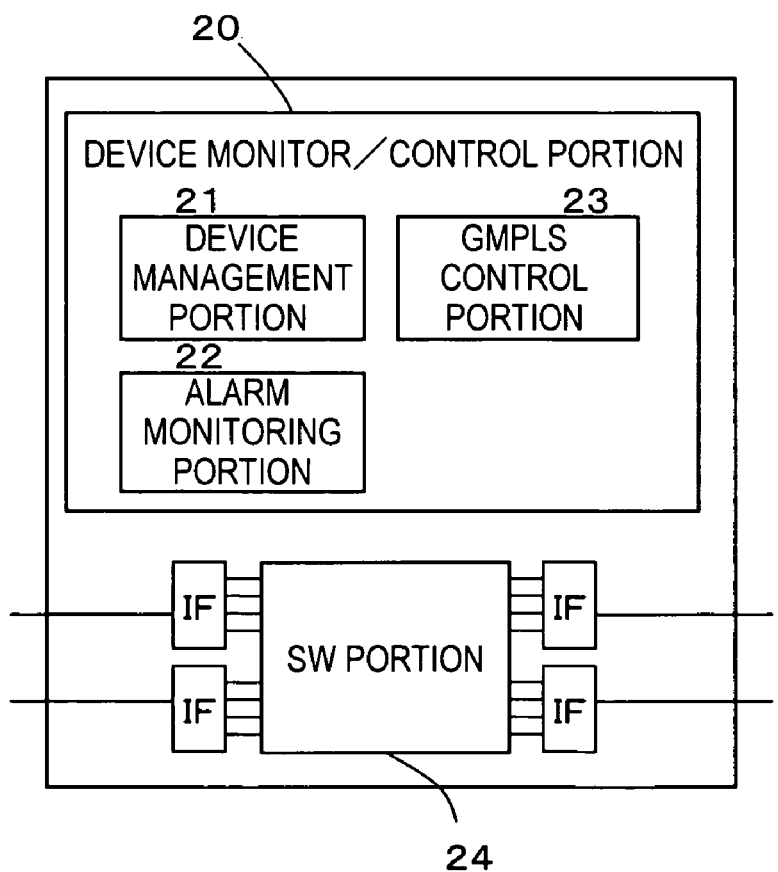
FIG. 7 is a block diagram of a configuration example of a node device.

FIG. 7 is a block diagram of a configuration example of the node device. A device monitor/control portion 20 for managing and controlling the devices has a device management portion 21 for performing packet generation, holding and management and the like of set information, and an alarm monitoring portion 22 for monitoring and notifying errors. When provided with a GMPLS control plane, the device monitor/control portion 20 further has a GMPLS control portion for controlling functions of signaling and the like, which is a characteristic of the present invention. The abovementioned notified topology information is held in the device management portion 21.

Here, the development of the GMPLS (Generalized Multi-Protocol Label Switching) has been promoted as a technology for implementing routing. In optical communication networks, execution of path routing setting in an autonomous decentralized manner using this GMPLS has been increasingly demanded.

The GMPLS is for performing a process of determining a routing path on the basis of a wavelength of an optical signal, and is premised on that there is no restriction (non-blocking and the like) based on signal transmission quality and the like.

Figure 1:
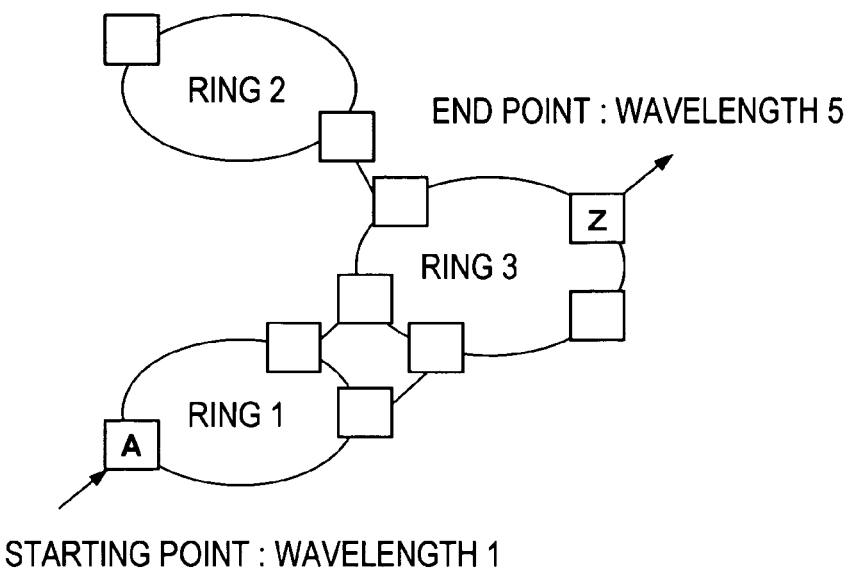
FIG. 1 is a figure for explaining a ROADM ring network.
Figure 2:
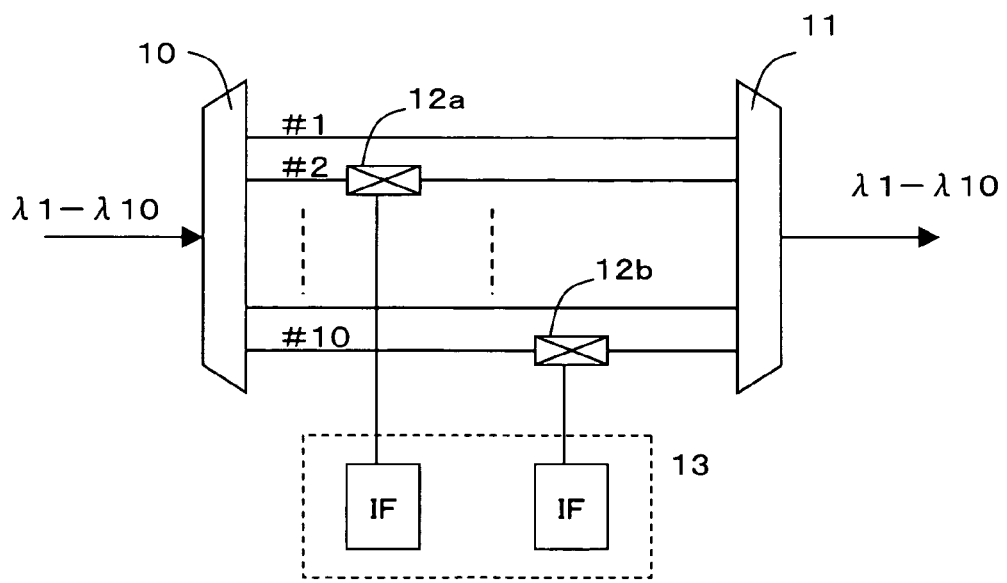
FIG. 2 is a configuration example of a ROADM device constituting a ring 1 in the network shown in FIG. 1.
Figure 3:
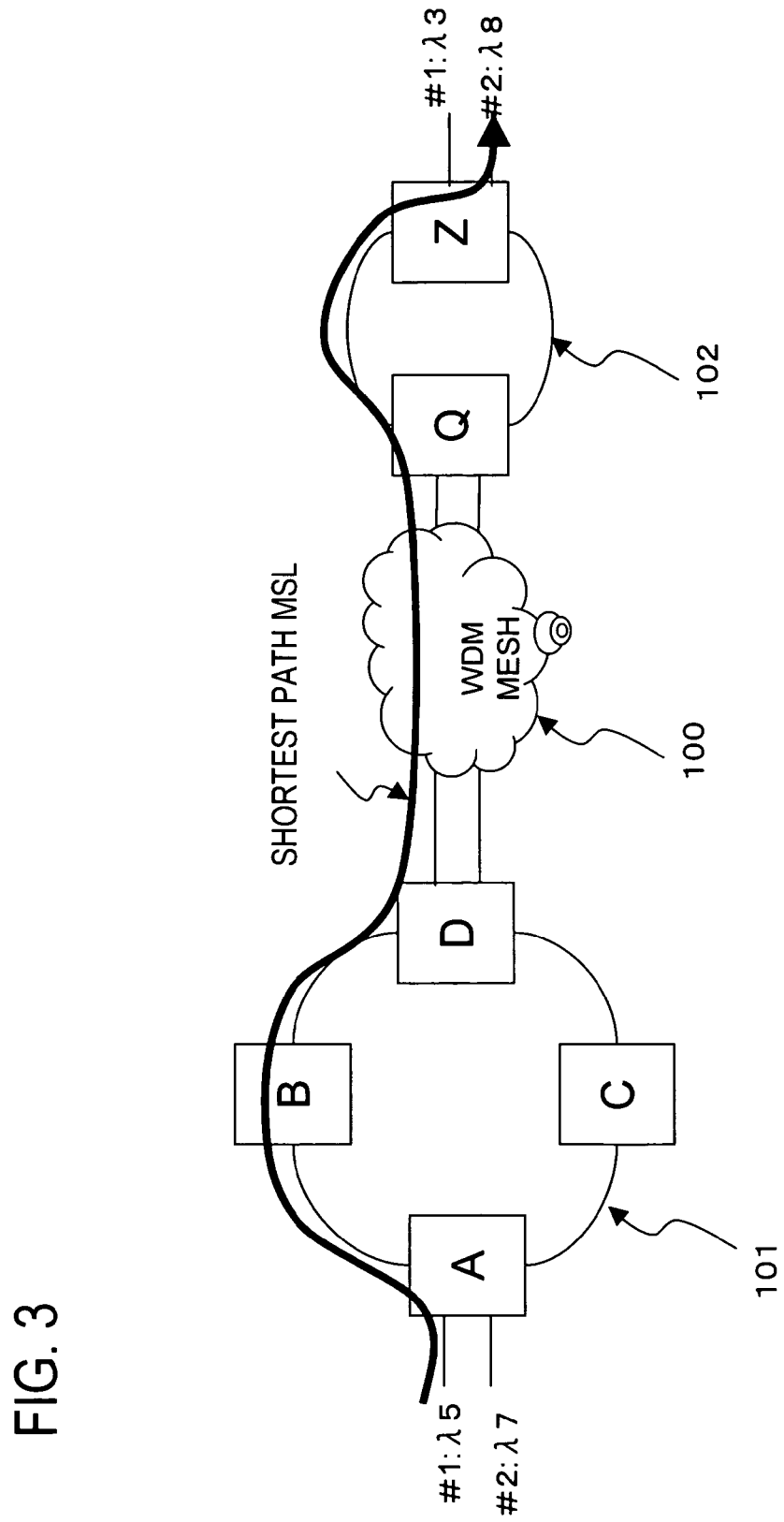
FIG. 3 is a network in which a ROADM ring network 100 and a WDM network 200 are connected to each other.

In the configuration example of the node device shown in FIG. 7, a switch function portion 24 for inserting a signal in a branched manner is provided as the ROADM device shown in FIG. 2.

Figure 8:
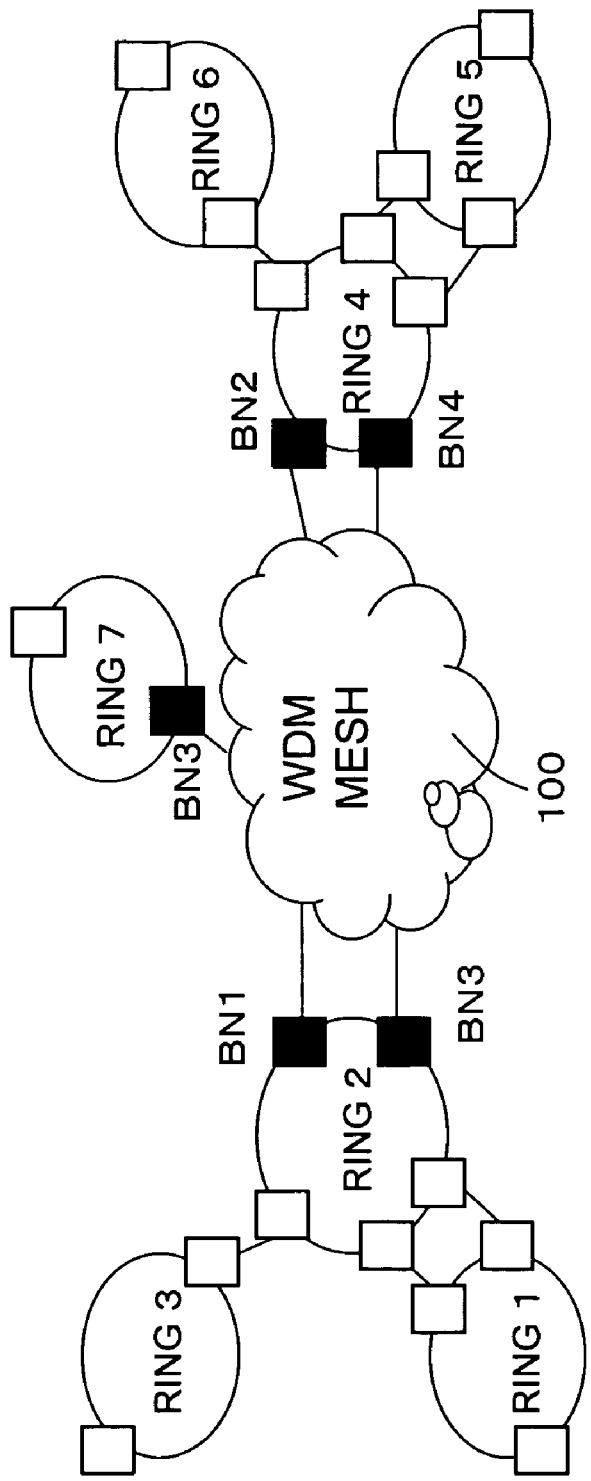
FIG. 8 is a figure showing a configuration example of a network of a second embodiment of the present invention.

FIG. 8 is a figure showing a configuration example of a network of a second embodiment of the present invention. As shown in this network configuration of the present embodiment, a state in which rings are connected to the core network (mesh network) 100 by two or more node devices is referred to as "multi formation ring" as contrasted with the abovementioned single formation.

In the network configuration shown in FIG. 8, the ring 2 and ring 4 are both connected to the core network (mesh network) 100 by two node devices respectively, and these node devices are also defined as border nodes BN1 through BN4.

In this embodiment as well, when path routing computation is performed in a decentralized manner, the routing protocol is used so that each node device notifies the topology information inside the network. When path routing computation is performed in a concentrated manner, the topology information is held as device information in the NMS (network management system).

Figure 9:
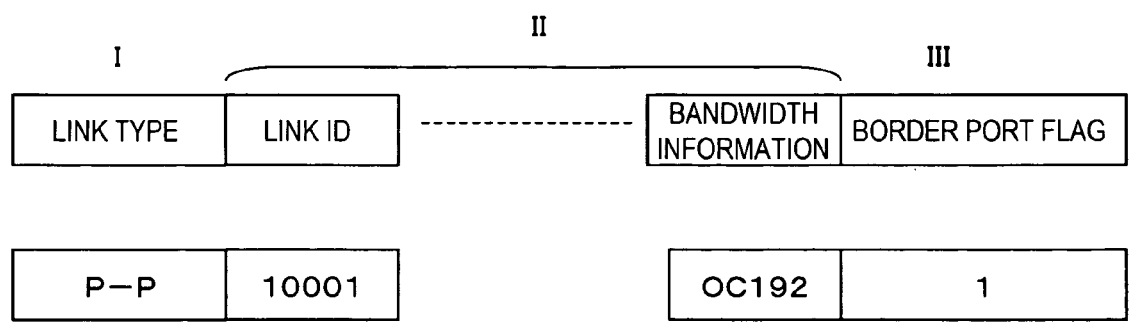
FIG. 9 is a figure showing an example of link information when a routing protocol corresponding to the embodiment of FIG. 8 is used.

FIG. 9 shows an example of the link information when a routing protocol corresponding to the embodiment of FIG. 8 is used. With the general routing protocol (OSPF-TE), router address information and link information are notified as described above, but, as shown in FIG. 9, each node device applies, in addition to link information I, II, a flag III indicating whether the port is a border port or not, and notifies this information. A border port is defined as a port in which data is sent outside from the ring.

If the port is the border port, flag III "1" is notified, and if not, "0" is notified. In the examples shown in FIG. 9, for example, for the link information of the border node BN1, one-to-one connection (P-P) is stored as the link information I, 10001 as the link ID is stored for the link information II, and 0C1921 is stored as bandwidth information, and further a flag "1", which indicates that the port is a border port, is set.

Here, in order to notify the link information by means of each node device, prior to this notification it is necessary to find out whether or not the home node in particular is a border node and whether or not the port is a border port.

Figure 10:
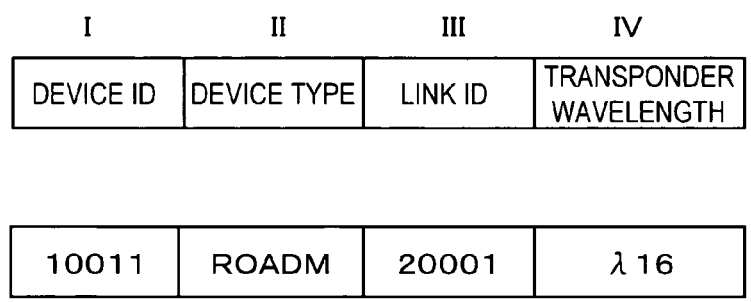
FIG. 10 is a figure for explaining exchange of border port identification information.

For this purpose, the link information is exchanged between the adjacent devices y using a LMP (Link Management Protocol) or the like. Border port identification information shown in FIG. 10 is exchanged using this protocol or a unique protocol. As the border port identification information, information on a device ID (I), device type (II), and connected link ID (III) of the node, and wavelength information in a transponder are exchanged.

In the example shown in FIG. 10, the device ID is 10011, the device type is the ROADM device with restricted wavelength, the link ID is 20001, and the transponder wavelength is $\lambda 16$.

In this manner, the border port identification information is exchanged between the devices, and, when a device with restricted wavelength, such as the ROADM device as indicated in the device type (II), is connected to a device with no restricted wavelength, such as a packet cross switch (PXC), the device with restricted wavelength is defined as a border node, and the link between the devices is defined as a border link.

Regarding the network configuration of the first embodiment of the present invention as shown in FIG. 5, and the network configuration of the second embodiment of the present invention as shown in FIG. 8, embodiment methods of path routing computation according to the present invention are described hereinafter.

Figure 4:
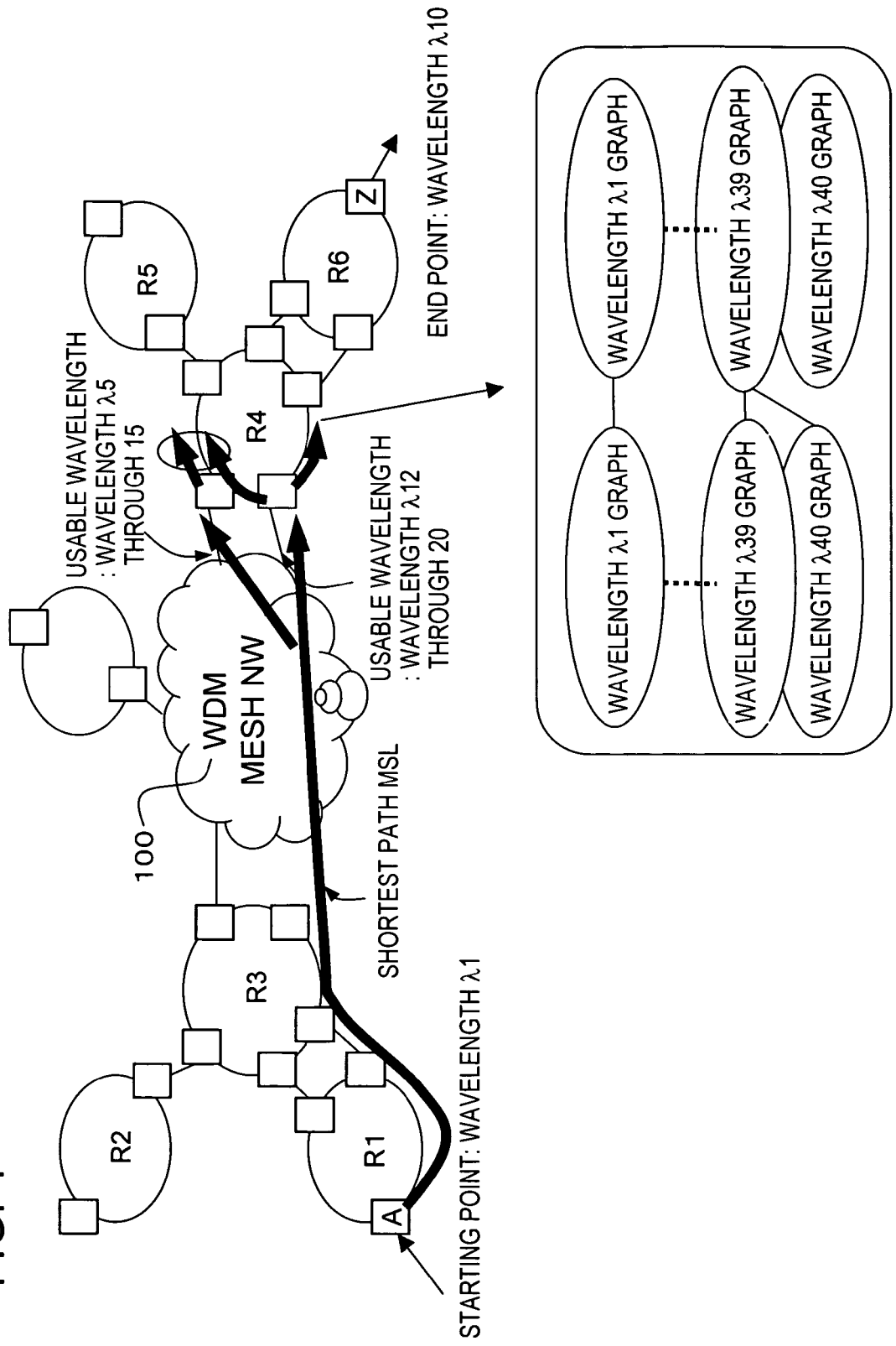
FIG. 4 is a figure showing a network configuration in which a network with restricted wavelengths and a network with not restricted wavelengths are connected to each other.

In the network configurations shown in FIG. 5 and FIG. 8, the ring networks with restricted wavelength are connected to the WDM network 100 with no restricted wavelength. Moreover, the network configuration shown in FIG. 8 has a disadvantage that a plurality of wavelength routings are present on the output side of the WDM network 100 with not restricted wavelength, as described above in FIG. 4, thus a candidate wavelength cannot be specified.

Therefore, the present inventor has devised, according to path routing computation of a subject network, a method of performing routing computation from the starting point node to the end point node, and similarly performing routing computation from the end point node to the border node, to combine thus obtained results of these routing computation, thereby enabling reduction of memory for routing computation.

Figure 11:
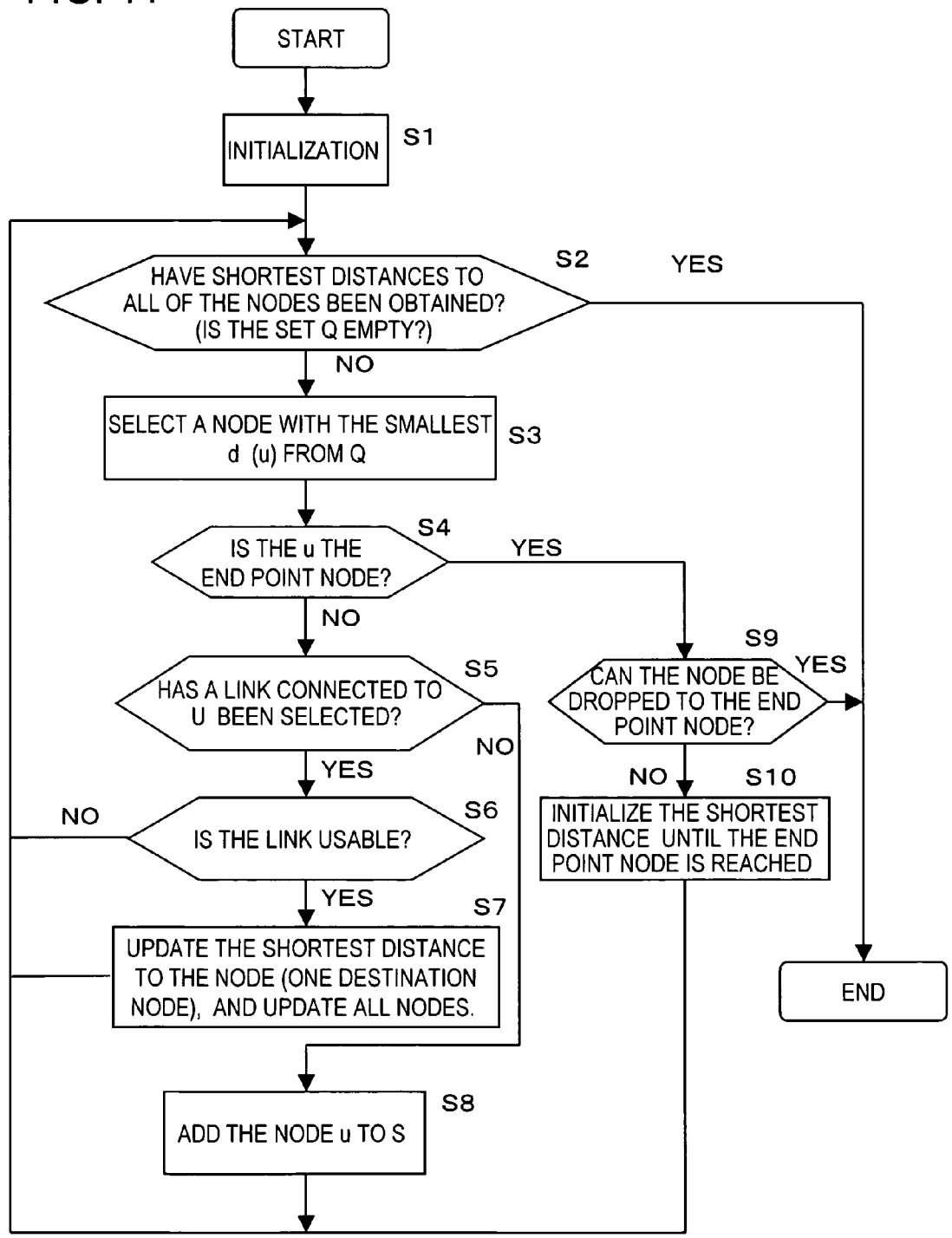
FIG. 11 is a flowchart of a path routing computation sequence according to the present invention.

FIG. 11 is a flowchart of a path routing computation sequence according to the present invention. Further, FIG. 12 through FIG. 15 are explanation drawings according to the flow sequence shown in FIG. 11. In the flow sequence shown in FIG. 11 general Dijkstra method is used as a general routing search sequence.

Figure 12:
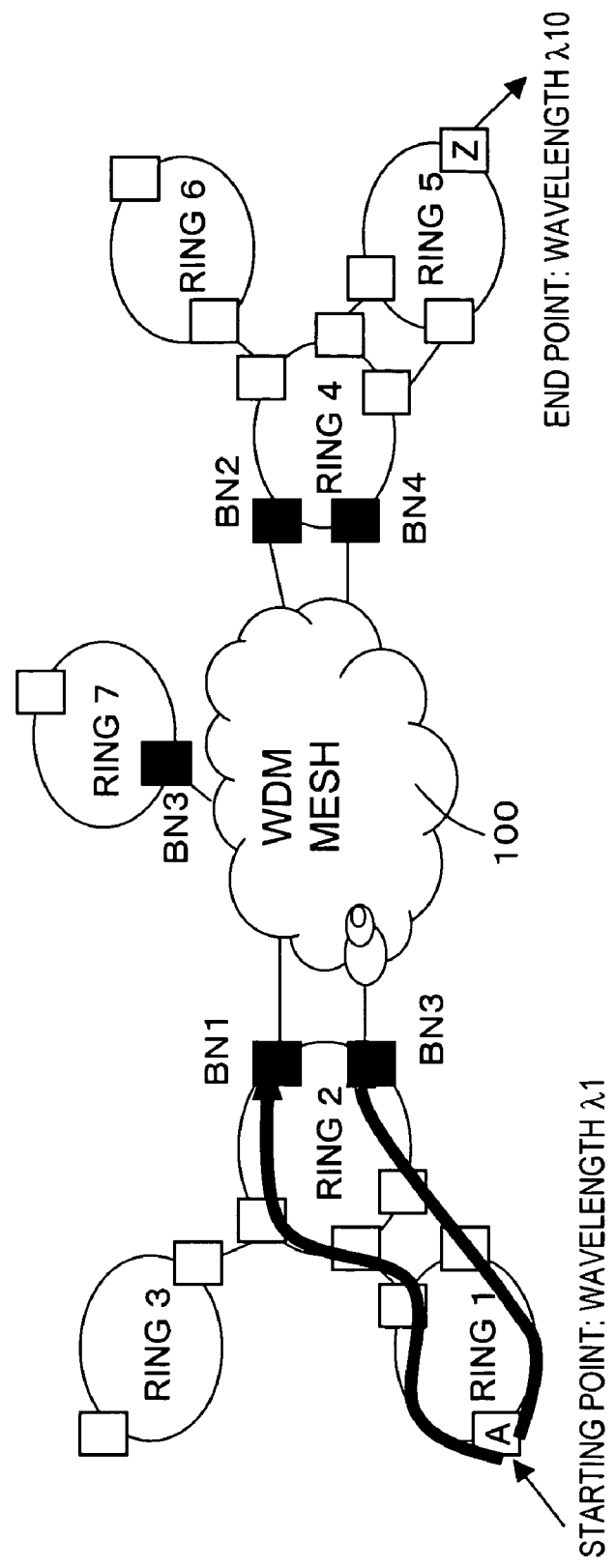
FIG. 12 is a figure showing a state of search at the lowest cost from a starting point node A to a border node.
Figure 13:
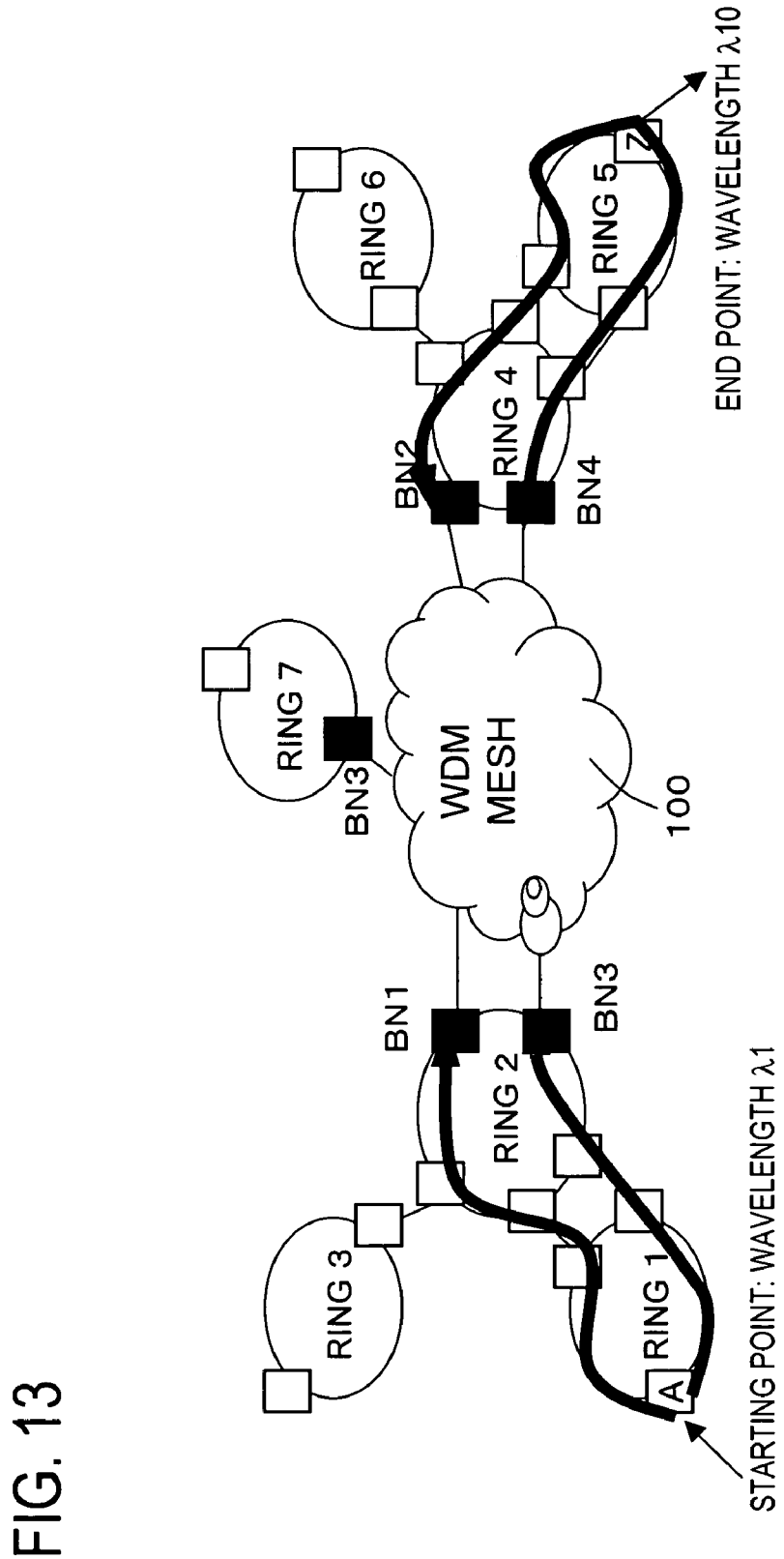
FIG. 13 is a figure showing a state of search at the lowest cost from an end point node Z to a border node.

In FIG. 12, searching for a path is supposedly performed from the node A of the ring 1 to the node Z of a ring 5 by means of routing computation.

In the case of a decentralized processing system, this routing computation is performed on the basis of the address information and link information, which are previously notified to the node A on the basis of a setting request from an originating user. In the case of a centralization system, this routing computation is performed by means of the NMS which is not shown. This routing computation is executed by the GMPLS control portion 23 having the device configuration shown in FIG. 7.

In FIG. 11, first of all, the node A is a starting point node A due to initialization of data (step S1), thus distance 0: $d(NA)=0$, and link: $L(NA)=$wavelength $\lambda 1$ are set. Other nodes are set to be $d(X)=\infty$, and $L(X)=$null.

In this step, in judgment on whether the shortest distances to all of the nodes are obtained (i.e. whether a set Q is empty) (step S2), since not all shortest distances are obtained, a negative output (NO) is obtained.

A node with the shortest distance d (u) from the set Q is the node A, thus this node is selected (step S3).

If the shortest distances to all of the nodes are obtained (step S2, YES), the process of searching for a path from the starting point node A to the border node BN1 or BN3 is ended.

Subsequently, it is judged whether the node A is the final node (border node BN1 or BN3 (step S4). If the node A is not the final node (step S4, NO), it is judged whether a link connected to the node A is selected (whether a link is present) (step S5). Two links are connected to the node A, thus these two links are checked.

Then, since L (A)=wavelength $\lambda 1$, it is determined whether the wavelength $\lambda 1$ can be used for the two links (link L10, L11, hereinafter) (step S6).

If the wavelength $\lambda 1$ is contained in the usable wavelengths of the two links L10, L11, the wavelength $\lambda 1$ can be used (step S6, YES).

Next, when a destination node for one of the two links L10, L11, i.e. the link L10, is set as BN1, $d(BN1)=\infty$ is compared with $d(A)+$cost $(L10)$, and the smaller cost is set to $d(BN1)$. In this case, $d(BN1)=1$, $R(BN1)=NA$, and $L(BN1, L10)=$wavelength $\lambda 1$ are set.

Similarly, when a destination node for the link L11 is set as BN3, $d(BN3)=\infty$ is compared with $d(A)+$cost $(L11)$, and the smaller cost is set to $d(BN3)$. In this case, $d(BN3)=1$, and $L(BN3, L11)=$wavelength $\lambda 1$ are set.

Returning to the step S2, NO is obtained from the step S5 since the links L10, L11 are already selected in the step S5, thus the process proceeds to a step S8 where the node A is added to S, and then the processing is returned to the step S2.

Here, since the end point node is the border node, if a node u is the border node, this means that the node u is the endpoint node in the step S4 (step S4, YES). Hence, it is judged whether the node can be branched at this node u to the end point node (step S9). If the node can be branched (step S9, YES), the process of searching for a path from the starting point node to the border node is ended (see FIG. 12).

If the node cannot be branched to the end point node (step S9, NO), the shortest distance is initialized and the processing is returned to the step S2.

Therefore, the obtained short distance is initialized for the next execution of shortest distance search for searching for a path from the end point node Z to the border node (step S10). Subsequently, the processes between the step S2 through the step S10 are executed with the end point node Z as the initial node. Accordingly, a path from the endpoint node Z to the border node is obtained (see FIG. 13).

At this moment, if the border nodes obtained from the starting point A side are different from the border node obtained from the end point Z side, that is, if the border nodes obtained from the starting point A side do not have the border node obtained from the end point Z side, further routing search is carried out in the network 100 with no restricted wavelength, with the border nodes BN1, BN3 obtained from the starting point node A as starting points. This routing search also is executed using the Dijkstra method.

Similarly, with the border node obtained from the end point node Z side as a starting point, further routing search is performed in the network 100 with no restricted wavelength.

Figure 14:
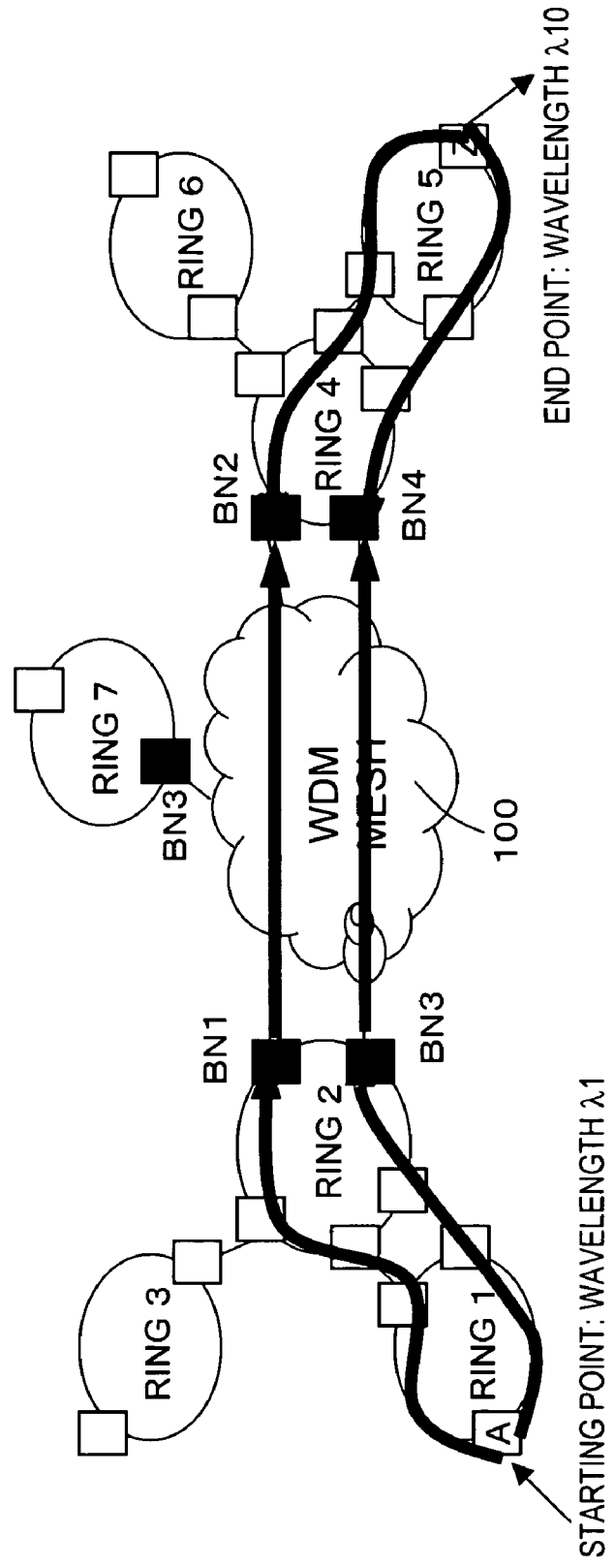
FIG. 14 is a figure showing a state of search for the same border node through path search from the starting point node A and from the end point node Z.

In this manner, routing search is executed from the starting point node A side and the end point node Z side alternately in accordance with the flow shown in FIG. 11, and this routing search is repeatedly performed until the same border node is reached (see FIG. 14).

When the routing search to reach the same border node is ended in the above-described routing search process, the paths and costs which were obtained so far are combined, and the path of the lowest cost is taken as the shortest distance.

Figure 15:
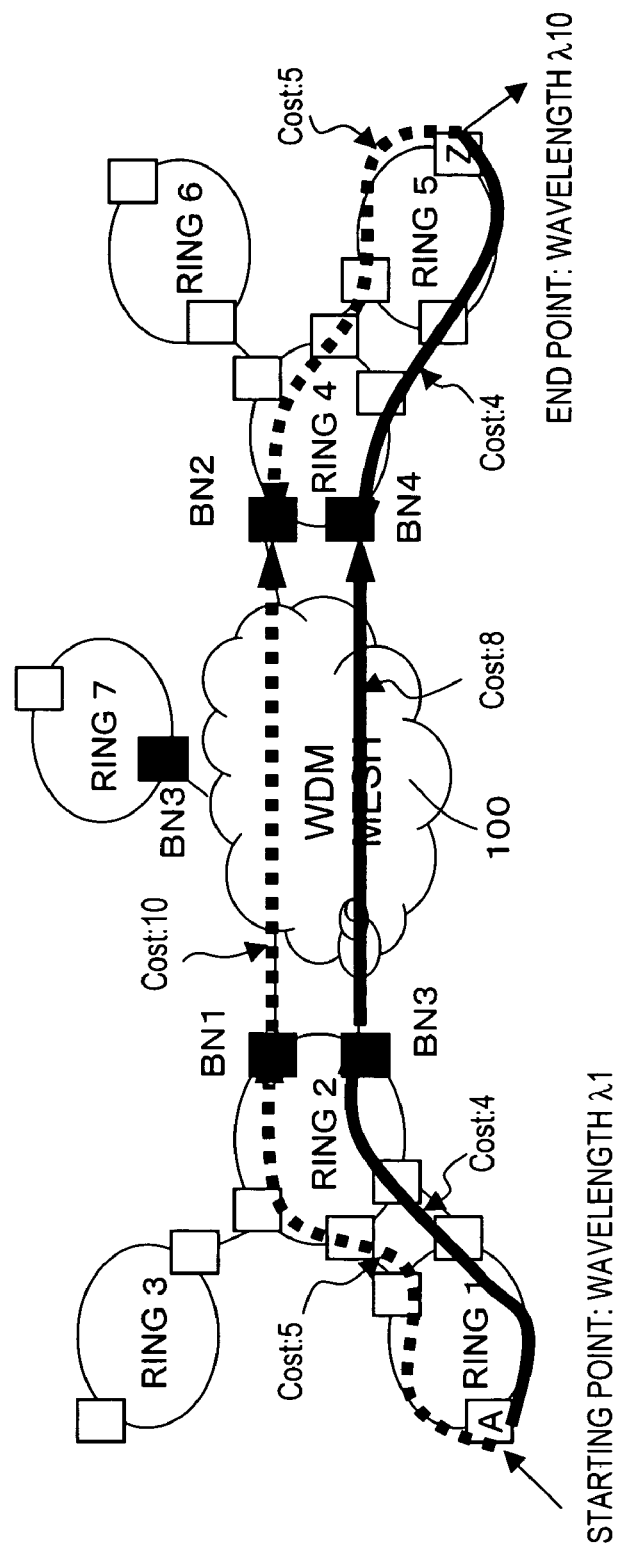
FIG. 15 is a figure showing a path obtained from FIG. 12 through FIG. 14, the path being the lowest cost path.

FIG. 15 is a figure showing a path of the lowest cost path which is obtained in the above manner, wherein a path on a lower side, which runs in such a manner as node A-border node BN3-BN4-end point node Z, is selected as the path of the lowest cost.

Figure 16:
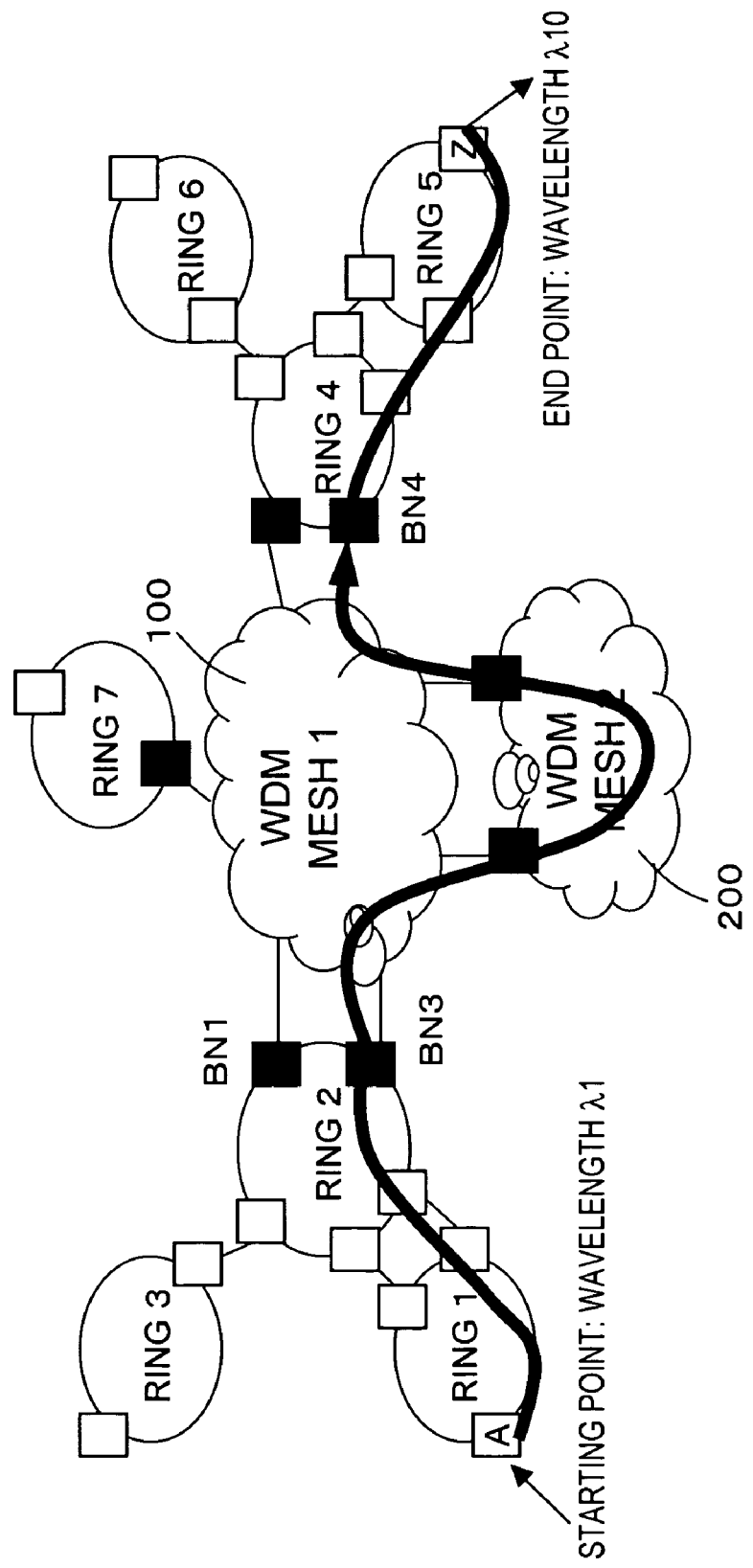
FIG. 16 is a figure showing an example in which another network 200 is connected to the network configuration shown in FIG. 8, and a plurality of border nodes are used as pathways.

FIG. 16 shows an example in which another network 200 is connected to the network configuration shown in FIG. 8, and a plurality of border nodes are used as pathways.

In such a network configuration, the routing search process described above is executed until the same border node is reached, but sometimes the search is not executed for the nodes of all networks even when the paths shown by the arrows are obtained. In this case, improvement of the efficiency of routing search is achieved in consideration of the allowance of the costs.

For this purpose, simply a path of the lowest cost is previously obtained without considering the restrictions in wavelengths and the like at all. Then the lowest cost, which is simply obtained beforehand, is compared with the cost of a path which is searched in the above-described routing search process until the same border node is reached. As a result of this comparison, if the lowest cost, which is simply obtained beforehand, is within the allowance (within 120%, for example), this obtained path is taken as the lowest cost path in accordance with the flow shown in FIG. 11, without considering that the searching may not be performed for the nodes of all networks. The path search can be continued only when the allowance is exceeded.

As described above, in the network in which the ROADM and the like are connected to the mesh network in a multi-stage manner, it is necessary to consider a plurality of wavelengths in a plurality of subnetworks present at the output side of the network, thus a routing computation graph for the number of wavelengths is required. However, according to the present invention, such a routing computation graph for the number of wavelengths is no longer necessary, as described in the embodiments with reference to the drawings. Thus, even if the number of multiplexed wavelengths increases drastically to the hundreds, increase of the memory capacity for execution of routing computation can be avoided, whereby large industrial contribution is realized.

What is claimed is:

1. A path routing computation method in an optical communication network including a wavelength convertible subnetwork in which paths are connected in the form of a mesh, a first wavelength inconvertible subnetwork having a starting point node, and a second wavelength inconvertible subnetwork having an end point node, the first and second wavelength inconvertible subnetworks being connected via the wavelength convertible subnetwork, wherein out of the nodes constituting the first and second wavelength inconvertible subnetworks, a node having a port connected to the wavelength convertible subnetwork is defined as a border node, the path routing computation method comprising:

obtaining, for the first wavelength inconvertible subnetwork, a path from the starting point node to a border node in the first subnetwork; and obtaining, for the second wavelength inconvertible subnetwork, a path from the end point node to a border node in the second wavelength inconvertible subnetwork.

2. The path routing computation method according to claim 1, wherein when the end point node is searched by the step of obtaining, for the first wavelength inconvertible subnetwork, a path from the starting point node to a border node in the first wavelength inconvertible subnetwork, the routing computation is ended.

3. The path routing computation method according to claim 1, wherein if a border node, which is searched by the step of obtaining, for the first wavelength inconvertible subnetwork, a path from the starting point node to a border node in the first wavelength inconvertible subnetwork, does not have a border node which is searched by the step of obtaining, for the second wavelength inconvertible subnetwork, a path from the end point node to a border node in the second wavelength inconvertible subnetwork, routing computation is further performed alternately for the first wavelength inconvertible subnetwork and the second wavelength inconvertible subnetwork until the same border node is searched, with the searched border nodes as original points.

4. The path routing computation method according to claim 3, wherein a path of the lowest cost in a combination of the paths searched for the first wavelength inconvertible subnetwork and the second wavelength inconvertible subnetwork is taken as a shortest-distance path to be obtained.

5. The path routing computation method according to claim 1, wherein a path of the lowest cost in a combination of the paths searched for the first wavelength inconvertible subnetwork and the second wavelength inconvertible subnetwork is taken as a shortest-distance path to be obtained.

6. A path routing computation method in an optical communication network including a wavelength convertible subnetwork in which paths are connected in the form of a mesh, a first wavelength inconvertible subnetwork having a starting point node, and a second wavelength inconvertible subnetwork having an end point node, the first and second wavelength inconvertible subnetworks being connected via the wavelength convertible subnetwork, wherein out of the nodes constituting the first and second wavelength inconvertible subnetworks, a node having a port connected to the wavelength convertible subnetwork is defined as a border node, the path routing computation method comprising:

obtaining, for the first wavelength inconvertible subnetwork, a path from the starting point node to a border node in the first subnetwork; and obtaining, for the second wavelength inconvertible subnetwork, a path from the end point node to a border node in the second wavelength inconvertible subnetwork, wherein a path of the lowest cost in a combination of the paths searched for the first wavelength inconvertible subnetwork and the second wavelength inconvertible subnetwork is taken as a shortest-distance path to be obtained and, wherein the shortest path between the starting point node and the end point node is obtained as a predetermined shortest path in advance without considering wavelength limiting conditions, and the obtained shortest path is compared with the predetermined shortest path to determine whether to perform further routing search, on the basis of a predetermined rate with respect to the predetermined shortest path.

7. A path routing computation method in an optical communication network including a wavelength convertible subnetwork in which paths are connected in the form of a mesh, a first wavelength inconvertible subnetwork having a starting point node, and a second wavelength inconvertible subnetwork having an end point node, the first and second wavelength inconvertible subnetworks being connected via the wavelength convertible subnetwork, wherein out of the nodes constituting the first and second wavelength inconvertible subnetworks, a node having a port connected to the wavelength convertible subnetwork is defined as a border node, the path routing computation method comprising:

obtaining, for the first wavelength inconvertible subnetwork, a path from the starting point node to a border node in the first subnetwork; and obtaining, for the second wavelength inconvertible subnetwork, a path from the end point node to a border node in the second wavelength inconvertible subnetwork, wherein if a border node, which is searched by the step of obtaining, for the first wavelength inconvertible subnetwork, a path from the starting point node to a border node in the first wavelength inconvertible subnetwork, does not have a border node which is searched by the step of obtaining, for the second wavelength inconvertible subnetwork, a path from the end point node to a border node in the second wavelength inconvertible subnetwork, routing computation is further performed alternately for the first wavelength inconvertible subnetwork and the second wavelength inconvertible subnetwork until the same border node is searched, with the searched border nodes as original points, wherein a path of the lowest cost in a combination of the paths searched for the first wavelength inconvertible subnetwork and the second wavelength inconvertible subnetwork is taken as a shortest-distance path to be obtained, and wherein the shortest path between the starting point node and the end point node is obtained as a predetermined shortest path in advance without considering wavelength limiting conditions, and the obtained shortest path is compared with the predetermined shortest path to determine whether to perform further routing search, on the basis of a predetermined rate with respect to the predetermined shortest path.

8. An optical communication network system comprising:

a wavelength convertible subnetwork in which paths are connected in the form of a mesh;

a first wavelength inconvertible subnetwork including a plurality of nodes, one of which is a starting point node and transmitting signals at a fixed wavelength; and a second wavelength inconvertible subnetwork including a plurality of nodes, one of which is an end point node and transmitting signals at a fixed wavelength the first and second wavelength inconvertible subnetworks being connected via the wavelength convertible subnetwork, wherein, out of the nodes constituting the first and second wavelength inconvertible subnetworks, a node having a port connected to the wavelength convertible subnetwork is defined as a border node, and a path from the starting point node to a border node in the first wavelength inconvertible subnetwork and a path from the end point node to a border node in the second wavelength inconvertible subnetwork are obtained to set a path of the lowest cost, which is obtained in a combination of the paths searched for the first wavelength inconvertible subnetwork and the second wavelength inconvertible subnetwork, as a path from the starting point node to the end point node through the wavelength convertible subnetwork.

9. In an optical communication network including a wavelength convertible subnetwork in which paths are connected in the form of a mesh, and first and second wavelength inconvertible subnetworks connected via the wavelength convertible subnetwork, a node device which is connected to the wavelength convertible network as a border node and which is one of a plurality of node devices constituting the first and second wavelength inconvertible subnetworks, wherein address information and link information as topology information is notified in order to search for and set a path from a starting point node of the first wavelength inconvertible subnetwork to an end point node, of the second wavelength inconvertible subnetwork, and wherein the topology information includes information indicating that own node device is a border node if the information is notified from the border node.

\* \* \* \* \*